(No Model.)
M. & T. REYNOLDS.
GILL NET.
No. 255,671. Patented Mar. 28, 1882.
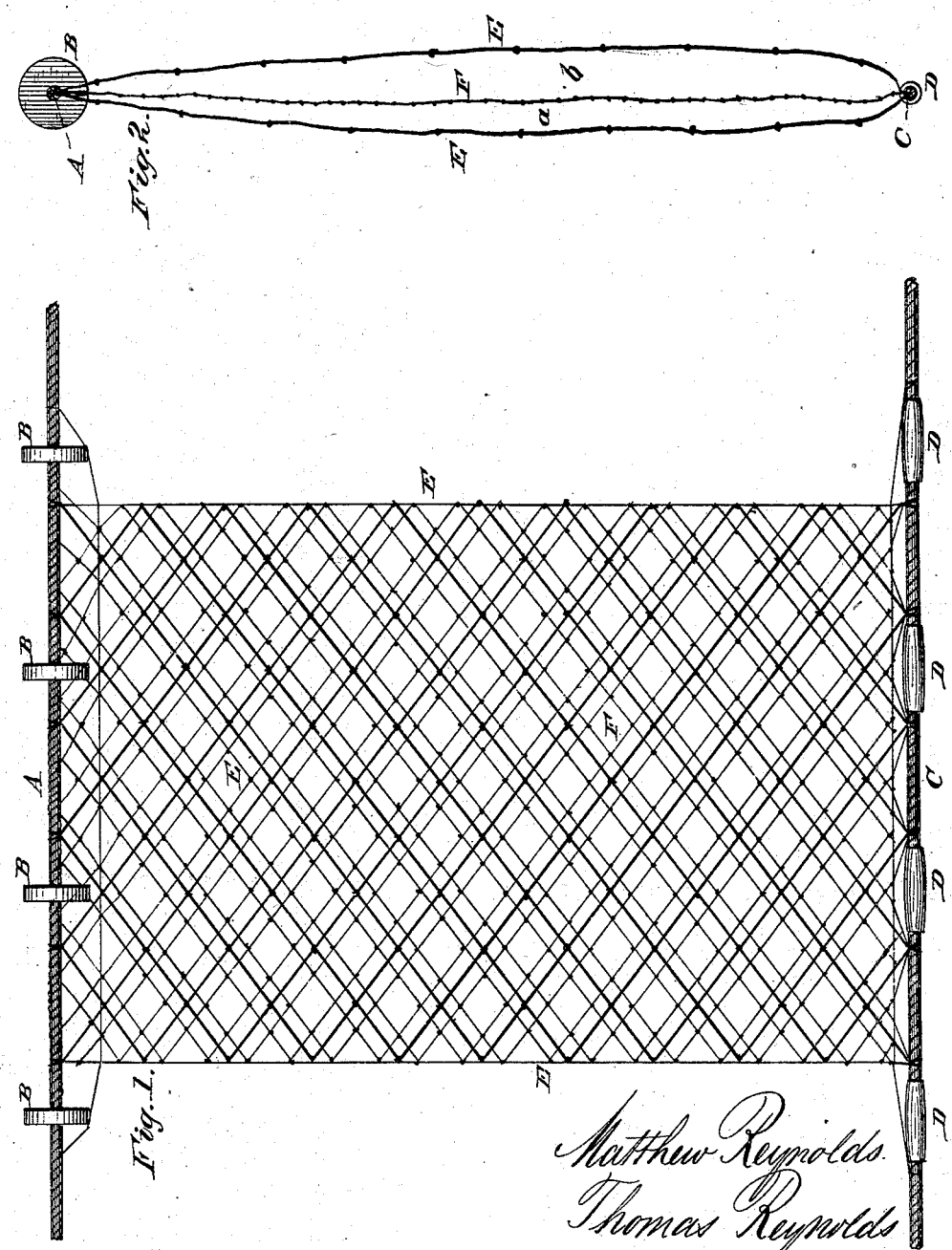

UNITED STATES PATENT OFFICE.

MATTHEW REYNOLDS AND THOMAS REYNOLDS, OF HAVRE DE GRACE, MD.

GILL-NET.

SPECIFICATION forming part of Letters Patent No. 255,671, dated March 28, 1882.

Application filed October 31, 1881. (No model.)

*To all whom it may concern:*

Be it known that we, MATTHEW REYNOLDS and THOMAS REYNOLDS, of Havre de Grace, in the county of Harford and State of Maryland, have invented certain new and useful Improvements in Gill-Nets; and we do hereby declare that the following is a full, clear, and exact description of the invention, which will enable others skilled in the art to which it appertains to make and use the same, reference being had to the accompanying drawings, which form a part of this specification, and in which—

Figure 1 is a side view of our improved gill-net, and Fig. 2 is a vertical transverse section of the same.

Similar letters of reference indicate corresponding parts in both the figures.

Our invention contemplates an improvement in gill-nets, as hereinafter more fully described, and particularly pointed out in the claim.

In the annexed drawings, A is the rope from which the net is suspended, which is provided with the usual floats, B B; and C is the bottom rope, which has the usual weights, D D, to keep the net suspended vertically across stream.

The net itself consists of three parts—viz., a double net, E E, the mesh of which is large enough to permit fish to pass through, and an intermediate net, F, which constitutes the gill-net proper, and which is therefore of finer mesh, so as to catch the fish by the gills in their effort to pass through. The three nets E, F, and E are united at top and bottom by the top and bottom ropes, A and C, respectively. In this manner it will be seen that two pockets are formed, (denoted by $a$ and $b$,) one on each side of the middle net, F. As the fish come against the net, say, from the right, they will pass through the coarse-mesh net E on that side into the pocket $b$, where they are caught in the gill-net F, which is re-enforced or braced in its bulged-out position by the net E on the opposite side, so that it is not likely to break, however great the strain to which it may be subjected. Fish entering the net from the other side (from the left) are in like manner caught in the gill-net in the pocket $a$ to the left of the central gill-net, F. In hauling the net the side nets, E, forming a pocket, as described, prevent the fish caught in the middle net from becoming disengaged, so that there is no loss in the haul, however large the catch may be.

Having thus described our invention, we claim and desire to secure by Letters Patent of the United States—

The improved gill-net herein shown and described, composed of a middle net, F, or gill-net proper, placed between two nets, E and E, to form the pockets $a$ and $b$, the inner net being of finer mesh than the two side nets between which it is placed, substantially as set forth.

In testimony that we claim the foregoing as our own we have hereunto affixed our signatures in presence of two witnesses.

MATTHEW REYNOLDS.
THOMAS REYNOLDS.

Witnesses:
JNO. A. RUSSELL,
WM. G. WHITNEY.